United States Patent
Kang et al.

(10) Patent No.: US 8,886,199 B2
(45) Date of Patent: Nov. 11, 2014

(54) APPARATUS AND METHOD FOR CONTROLLING INTERFERENCE VIA INFORMATION EXCHANGE BETWEEN BASE STATIONS IN COMMUNICATION SYSTEM

(75) Inventors: Nam-Koo Kang, Suwon-si (KR); Jae-Hee Cho, Seoul (KR); Byung-Chan Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 13/360,486

(22) Filed: Jan. 27, 2012

(65) Prior Publication Data

US 2012/0196642 A1    Aug. 2, 2012

(30) Foreign Application Priority Data

Jan. 28, 2011    (KR) .................. 10-2011-0008600

(51) Int. Cl.
*H04W 36/00*    (2009.01)
*H04W 52/24*    (2009.01)
*H04W 52/14*    (2009.01)

(52) U.S. Cl.
CPC .......... *H04W 52/243* (2013.01); *H04W 52/143* (2013.01)
USPC ............................................. 455/443; 455/1

(58) Field of Classification Search
USPC ................. 455/443, 444, 447, 452.2, 69, 522
See application file for complete search history.

(56) References Cited

U.S. PATENT DOCUMENTS 7,742,444 B2 *    6/2010    Mese et al. .................... 370/318
2008/0039131 A1 *    2/2008    Kaminski et al. ............. 455/522

* cited by examiner

*Primary Examiner* — Tu X Nguyen

(57) ABSTRACT

An apparatus and a method control interference via inter-base station information exchange in a communication system. In a method for operating a serving base station, for controlling interference in a communication system, sum of yield loss amounts of terminals inside a neighbor base station by a power level rise of the serving base station is determined. Yield gain amounts of serving terminals by the power level rise of the serving base station are determined. The sum of the yield loss amounts of the terminals inside the neighbor base station by the power level rise of the serving base station is compared with the determined yield gain amounts of the serving terminals by the power level rise of the serving base station, so that a power level for each serving terminal is determined.

16 Claims, 10 Drawing Sheets

FFR

APPARATUS AND METHOD FOR CONTROLLING INTERFERENCE VIA INFORMATION EXCHANGE BETWEEN BASE STATIONS IN COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 28, 2011 and assigned Serial No. 10-2011-0008600, the entire disclosure of which is hereby incorporated by reference.

TECHNICAL FIELD OF THE INVENTION

In a $4^{th}$ generation (4G) communication system, which is the next generation communication system, a study for providing services of various Quality of Services (QoS) having a transmission speed of about 100 Mbps to a user is in active progress.

BACKGROUND OF THE INVENTION

More particularly, the current 4 G communication system evolves into a form of guaranteeing mobility and QoS in a Broadband Wireless Access (BWA) communication system such as a wireless Local Area Network (LAN) system and a wireless Metropolitan Area Network (MAN) system. A representative communication system thereof includes an Institute of Electrical and Electronics Engineers (IEEE)802.16e communication system and a $3^{rd}$ Generation Partnership Project (3GPP)/3GPP2 Long Term Evolution (LTE) communication system.

This study is approached in an aspect of raising spectral efficiency, and generally, it is widely known that frequency efficiency is maximized when a frequency reuse rate is 1. However, when the frequency reuse rate is 1, the same frequency channel is reused by all base stations, so that a large interference is generated between cells. Since an inter-cell interference becomes large even when each base station raises transmission power under this circumstance, capacity does not increase. Therefore, to raise frequency efficiency, it is important to effectively control the inter-cell interference.

A technique proposed to accomplish this purpose is a Fractional Frequency Reuse (FFR). The FFR can effectively control the inter-cell interference via inter-neighbor base station frequency resource distribution.

FIG. 1 illustrates a frequency allocate pattern of neighbor three sectors in a conventional FFR technique.

Referring to FIG. 1, some (non-segmented partially used sub-carrier (PUSC) zone) 100 of frequency resources are resources all used by three sectors $\alpha,\beta,\gamma$, and are primarily allocated to users located in a cell intermediate region less influenced by the inter-cell interference. The rest (segmented PUSC zone) 110 of the frequency resources are resources used by the three sectors $\alpha,\beta,\gamma$ such that they do not overlap, and are primarily allocated to users located in a cell boundary region much influenced by the inter-cell interference. That is, a resource used by one sector in the rest of the resources 110 is not used by neighbor sectors so that interference may not be generated to users located on the cell boundary region who have been allocated a relevant sector. As described above, the FFR technique may improve yield of users of the cell boundary region via SINR improvement.

However, the FFR technique should determine an inter-neighbor sector frequency allocate pattern and a power level in advance when installing a network. Therefore, a frequency allocate pattern and a power level for the FFR should be set suitable for a cell environment when a network is installed. After the network is installed, when the cell environment changes, the frequency allocate pattern and the power level should be manually changed via cell planning.

In addition, in the case where users are concentrated on a cell boundary or a cell intermediate region instantaneously even when a cell environment does not change, an FFR frequency allocate pattern and a power level need to be changed suitable instantaneously. For example, in the case where users are concentrated on a cell intermediate region, since all of the users inside the cell are less influenced by interference, it is optimum to operate an entire frequency resource for a non-segmented PUSC zone. For another example, in the case where all users are located in a cell boundary region, since all of the users inside the cell are much influenced by interference, it is optimum to reduce resources operated for a non-segmented PUSC zone and increase resources operated for a segmented PUSC zone. However, since the conventional FFR technique uses a frequency allocate pattern and power level determined and set in advance, it is impossible to adaptively control the frequency allocate pattern and power level according to an instantaneous user distribution.

SUMMARY OF THE INVENTION

To address the above-discussed deficiencies of the prior art, it is a primary object to provide at least the advantages described below. Accordingly, an aspect of the present disclosure is to provide an apparatus and a method for controlling interference via inter-base station information exchange in a communication system.

Another aspect of the present disclosure is to provide an apparatus and a method for controlling an inter-cell interference in an aspect of an entire system by adaptively controlling a downlink transmission power level of a terminal according to a cell environment or real-time user distribution via inter-base station information exchange in a communication system.

Still another aspect of the present disclosure is to provide an apparatus and a method for adaptively determining downlink transmission power level of a serving terminal by exchanging between base stations information regarding yield loss amounts of serving terminals by a power level rise of a neighbor base station, and comparing sum of yield loss amounts of terminals inside a neighbor base station by a power level rise of a serving base station with yield gain amounts of serving terminals by the power level rise of the serving base station in a communication system.

Other aspects, advantages and salient features of the present disclosure will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts

Throughout the drawings, like reference numerals will be understood to refer to like parts, components and structures.

DETAILED DESCRIPTION OF THE INVENTION

FIGS. 2A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention.

Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present disclosure provide an alternative for controlling an inter-cell interference in an aspect of an entire system by controlling a downlink transmission power level of a terminal via inter-base station information exchange in a communication system. More particularly, exemplary embodiments of the present disclosure provide an alternative for adaptively determining downlink transmission power level of a serving terminal by exchanging between base stations information regarding a yield loss amount of serving terminals by a power level rise of a neighbor base station, and comparing sum of yield loss amounts of terminals inside a neighbor base station by a power level rise of a serving base station with a yield gain amount of serving, terminals by the power level rise of the serving base station in a communication system.

Figure 1:
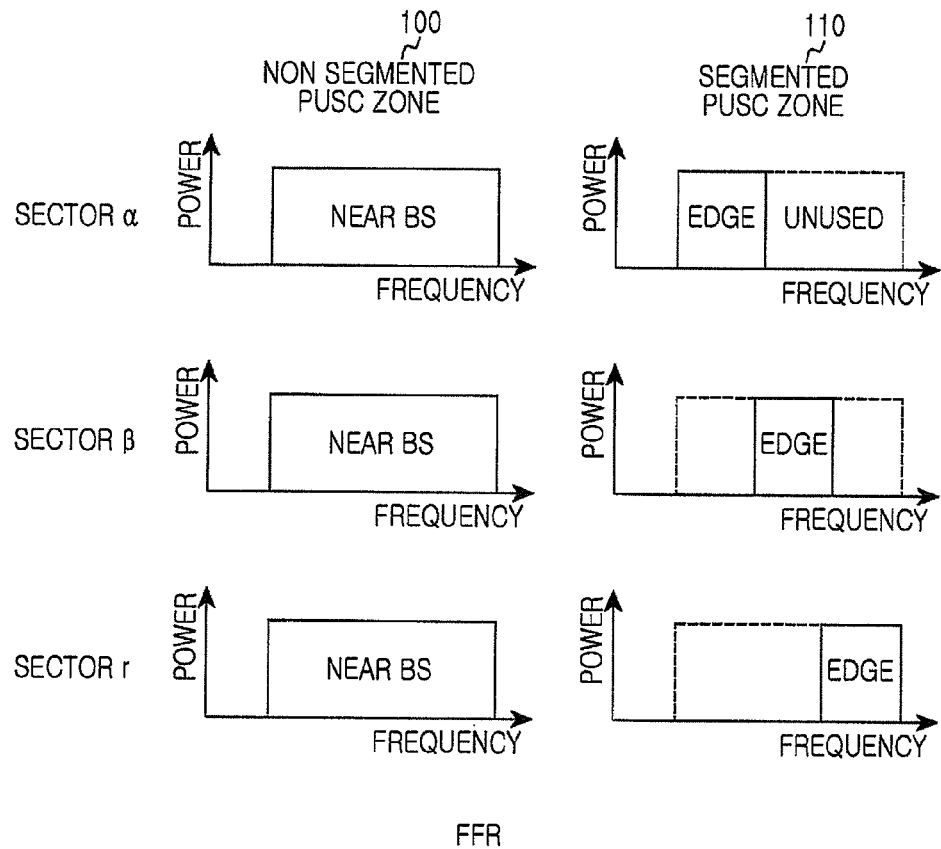
FIG. 1 illustrates a frequency allocate pattern of neighbor three sectors in an conventional FFR technique.
Figure 2A:
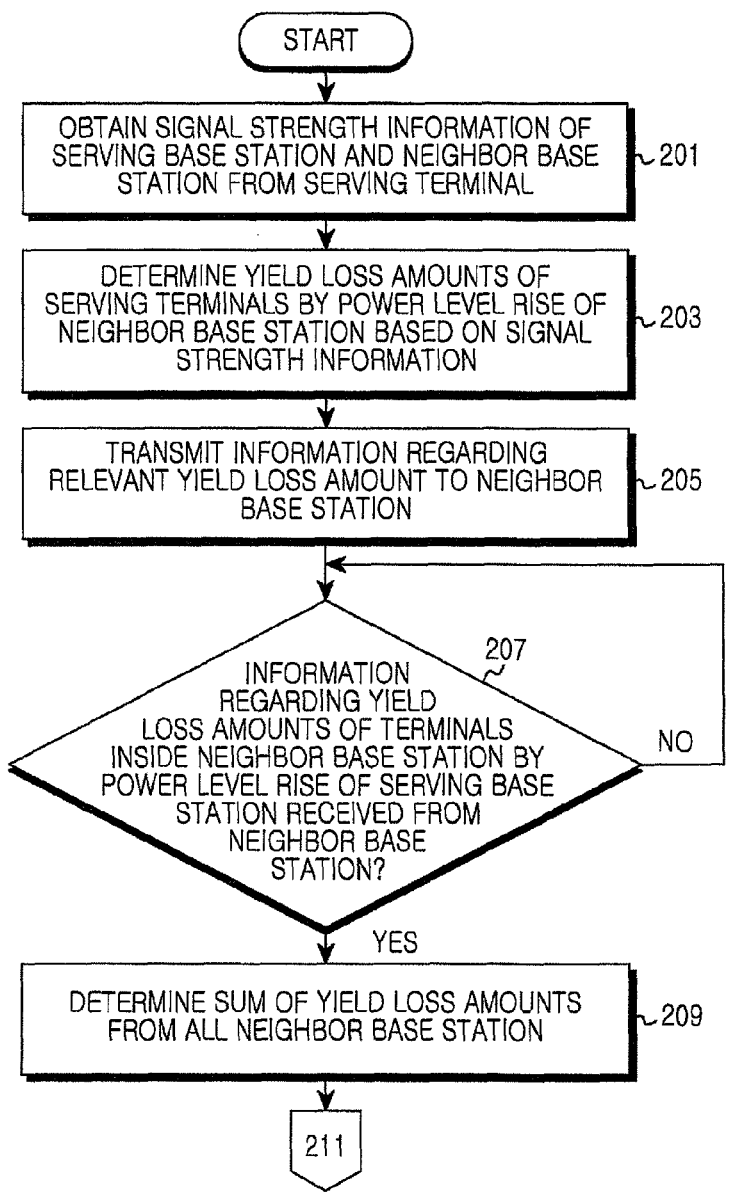
FIGS. 2A-B illustrate a method for determining a downlink transmission power level of a serving terminal via information exchange with neighbor base stations at a serving base station in a communication system according to an exemplary embodiment of the present disclosure.
Figure 2B:
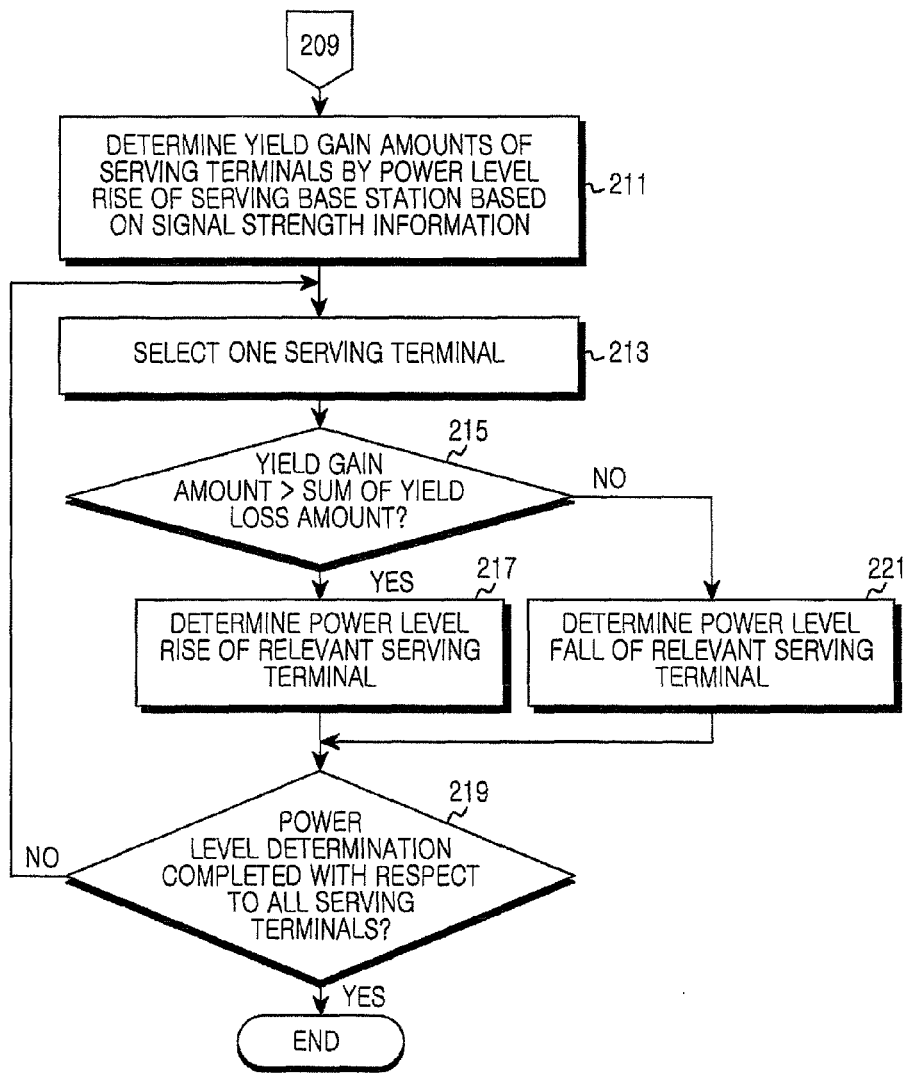

FIGS. 2A-B illustrate a method for determining a downlink transmission power level of a serving terminal via information exchange with neighbor base stations at a serving base station in a communication system according to an exemplary embodiment of the present disclosure.

Referring to FIGS. 2A-B, the serving base station obtains signal strength information regarding the serving base station and a neighbor base station from serving base stations inside a cell in step 201. Here, the serving base station requests serving terminals to measure signal strength of the serving base station and the neighbor base station and report the same, and receives the measured signal strength from the serving, terminals, thereby obtaining signal strength information regarding the serving base station and the neighbor base station. Here, the signal strength information may be Received Signal Strength Indicator (RSSI) information.

The serving base station determines yield loss amounts of the serving, terminals by a downlink power level rise (for example, 3 dB rise) of a neighbor base station based on the obtained signal strength information regarding the serving base station and neighbor base station for each serving terminal in step 203.

For this purpose, first, the serving base station determines a current channel state value (Channel Quality Information (CQI)), a channel state value of an example where a neighbor base station raises a downlink power level, a channel state value of an example where the serving base station raises a downlink power level for each serving terminal, and determines a Modulation order Product code Rate (MPR) value applicable to each serving terminal depending on respective channel state values as in Equation (1) to Equation (6) based on the obtained signal strength information regarding the serving base station and the neighbor base station. Here, the MPR denotes information representing a ratio of an information amount that can be transmitted as a radio resource of the same size, and serves as a value representing performance.

$$CQI_{CELL}[i] = \frac{RSSI_{SBS}[i][k]}{\sum_{m \neq k} RSSI_{NBS}[i][m] + N_0} \quad (1)$$

$$CQI_{CELL,var,NBS}[i][m] = \frac{RSSI_{SBS}[i][k]}{\sum_{m \neq k} RSSI_{NBS}[i][m] + N_0 + RSSI_{NBS}[i][m]} \quad (2)$$

$$CQI_{CELL,var,SBS}[i][m] = \frac{2 * RSSI_{SBS}[i][k]}{\sum_{m \neq k} RSSI_{NBS}[i][m] + N_0} \quad (3)$$

$$MPR[i] = f(CQI_{CELL}[i]) \quad (4)$$

$$MPR_{NBS}[i] = f(CQI_{CELL,var,NBS}[i][m]) \quad (5)$$

$$MPR_{SBS}[i] = f(CQI_{CELL,var,SBS}[i][m]) \quad (6)$$

Here, in Equation (1) to Equation (6), i denotes an index of a serving terminal, k denotes an index of a serving base station, and m denotes an index of a neighbor base station. In addition, $RSSI_{SBS}$ and $RSSI_{NBS}$ denote RSSI information regarding a serving base station obtained from a serving terminal, and RSSI information regarding a neighbor base station, respectively, and $N_0$ denotes power of a Gaussian noise determined depending on a system bandwidth, and has power density of −174 dBm/Hz.

That is, Equation (1) expresses a current channel state value with respect to a serving terminal i, Equation (2) expresses a channel state value of an example where a neighbor base station m raises a downlink power level with respect to a serving terminal i, and Equation (3) expresses a channel state value of an example where a serving base station k raises a downlink power level with respect to a serving terminal i. In addition, Equation (4) to Equation (6) express MPR value applicable to a serving terminal i depending on each channel state of Equation (1) to Equation (3). Here, for a function for obtaining an MPR value applicable to a serving terminal i, Shannon Capacity may be used or a table reference corresponding to a fixed Modulation and Coding Scheme (MCS) level may be used depending on a service purpose, a service environment, etc.

Here, the serving base station may determine a yield sensitivity $S_{NBS,var,Tput}[i]$ for a neighbor base station m, that is, a yield loss amount that may be generated to a serving terminal i by a downlink power level rise of the neighbor base station m with respect to the serving terminal i, as in Equation (7), using an MPR value applicable to a serving terminal i depending on the determined each channel state value.

$$S_{NBS,var,Tput}[i] = \frac{MPR[i]}{MPR_{NBS}[i]^a} \quad (7)$$

where 'a' is a weight and is suitably controllable depending on a service purpose.

The serving base station transmits information regarding a relevant yield loss amount to a neighbor base station via a backhaul communication in step 205. Here, the information regarding the yield loss amount transmitted to a neighbor base station includes information regarding an average value of yield loss amounts of serving terminals determined for the neighbor base station.

Here, the average value of the yield loss amounts of serving terminals determined for the neighbor base station m may be determined using Equation (8).

$$S_{NBS,var,Tput}[k][m] = \frac{\sum_i \frac{MPR[i]}{MPR_{NBS}[i]^a}}{NumMS} \quad (8)$$

Here, $S_{NBS,var,Tput}[k][m]$ is a value calculated and transmitted to a neighbor base station by a serving base station k, and denotes an average value of yield loss amounts of serving terminals determined for the neighbor base station m. Here, NumMS denotes a total number of serving terminals inside a cell.

After that, the serving base station determines whether information regarding, yield loss amounts of terminals inside a neighbor base station by a downlink power level rise of the serving base station is received from the neighbor base station via backhaul communication in step 207. Here, the information regarding the yield loss amounts received from the neighbor base station includes an average of yield loss amounts of terminals inside the neighbor base station determined for the serving base station, that is, information regarding $S_{NBS,var,Tput}[m][k]$. Here, $S_{NBS,var,Tput}[m][k]$ denotes yield sensitivity for a serving base station k calculated and transmitted to the serving base station k by the neighbor base station m.

When determining that the information regarding the yield loss amounts of terminals inside the neighbor base station by the power level rise of the serving base station is received from the neighbor base station via the backhaul communication in step 207, the serving base station determines sum of the yield loss amounts from all neighbor base stations in step 209.

Here, the sum of the yield loss amounts from all neighbor base stations is determined using Equation (9).

$$S_{sum,var,Tput} = \sum_{m \neq k} S_{NBS,var,Tput}[m][k] \quad (9)$$

The serving base station determines yield gain amounts of serving terminals by a downlink power level rise (for example, 3 dB rise) of the serving base station based on the obtained signal strength information regarding the serving base station and the neighbor base station for each serving terminal in step 211.

Here, the serving base station may determine a yield sensitivity $S_{SBS,var,Tput}[i]$ for a serving base station k, that is, a yield gain amount that may be generated to a serving terminal i by a downlink power level rise of the serving base station k with respect to a serving terminal i, as in Equation (10), using an MPR value applicable to the serving terminal i depending on the determined each channel state value.

$$S_{SBS,var,Tput}[i] = \frac{MPR_{SBS}[i]^b}{MPR[i]} \quad (10)$$

Here, b is a weight and is suitably controllable depending on a service purpose.

The serving base station selects one serving terminal not selected previously from serving terminals inside a cell in step 213.

The serving base station determines whether the determined yield gain amount is greater than sum of yield loss amounts from all neighbor base stations with respect to the selected serving terminal in step 215. That is, the serving base station determines whether a yield gain amount $S_{SBS,var,Tput}$

[i] of the selected serving terminal by a power level rise of the serving base station is greater than sum $S_{Sum,var,Tput}$ of yield loss amounts of terminals inside all neighbor base stations by the power level rise of the serving base station.

When determining that the determined yield gain amount is greater than the sum of the yield loss amounts from all the neighbor base stations with respect to the selected serving terminal in step 215, the serving base station determines a rise of a power level with respect to the selected serving terminal in step 217, and proceeds to step 219.

In contrast, determining that the determined yield gain amount is not greater than the sum of the yield loss amounts from all the neighbor base stations with respect to the selected serving terminal in step 215, the serving base station determines a fall of the power level with respect to the selected serving terminal in step 221, and proceeds to step 219.

The serving base station determines whether it has completed determination of a power level with respect to all serving terminals inside a cell in step 219.

When determining that it has not completed determination of the power level with respect to all the serving terminals inside the cell in step 219, the serving base station returns to step 213 to repeatedly perform subsequent steps.

In contrast, when determining that it has completed determination of the power level with respect to all the serving terminals inside the cell in step 219, the serving base station ends the algorithm according to an exemplary embodiment of the present disclosure. Accordingly, the serving base station may perform a downlink power control on a scheduled serving terminal using the determined power level for each serving terminal. The determined power level for each serving terminal maximizes a gain in an aspect of a system yield.

Figure 3:
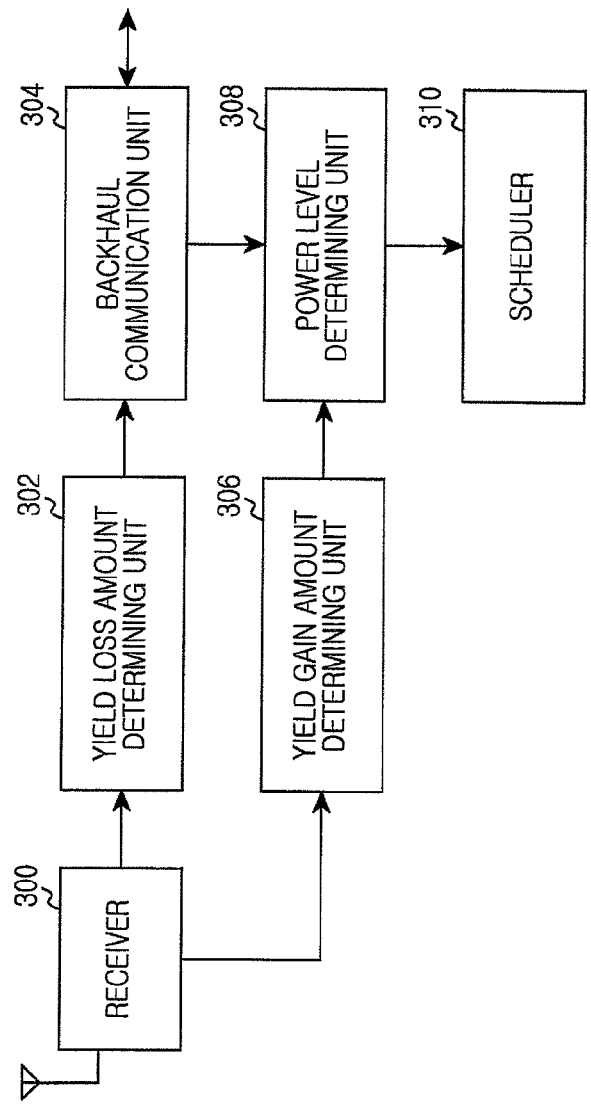
FIG. 3 illustrates a serving base station (or neighbor base station) in a communication system according to an exemplary embodiment of the present disclosure.

FIG. 3 illustrates a serving base station (or neighbor base station) in a communication system according to an exemplary embodiment of the present disclosure.

As illustrated, the serving base station includes a receiver 300, a yield loss amount determining unit 302, a backhaul communication unit 304, a yield gain amount determining unit 306, a power level determining unit 308, and a scheduler 310.

Referring to FIG. 3, the receiver 300 obtains signal strength information of a serving base station and a neighbor base station from serving terminals inside a cell. Here, the serving terminals may measure signal strength of the serving base station and the neighbor base station in response to a request of the serving base station, and report the same. Accordingly, the receiver 300 may obtain signal strength information of the serving base station and the neighbor base station from the serving terminals. Here, the signal strength information may be an RSSI, for example.

The yield loss amount determining unit 302 determines yield loss amounts of serving terminals by a power level rise (for example, 3 dB rise) of the neighbor base station based on the obtained signal strength information of the serving base station and the neighbor base station for each serving terminal.

The backhaul communication unit 304 transmits information regarding yield loss amounts of serving terminals by a power level rise of a neighbor base station to the neighbor base station via backhaul communication. Here, the information regarding the yield loss amount transmitted to the neighbor base station includes information regarding an average value of yield loss amounts of serving terminals determined with respect to the neighbor base station. In addition, the backhaul communication unit 304 receives information regarding yield loss amounts of terminals inside a neighbor base station by a power level rise of a serving base station, from the neighbor base station via backhaul communication. Here, the information regarding a yield loss amount received from the neighbor base station includes information regarding an average value of yield loss amounts of terminals inside the neighbor base station determined with respect to the serving base station.

The yield gain amount determining unit 306 determines yield gain amounts of serving terminals by a power level rise (for example, 3 dB rise) of the serving base station based on the obtained signal strength information regarding the serving base station and the neighbor base station for each serving terminal.

The power level determining unit 308 compares sum of yield loss amounts of terminals inside all neighbor base stations by the power level rise of the serving base station, received from all the neighbor base stations via backhaul communication with yield gain amounts of serving terminals by a power level rise of the serving base station to adaptively determine a rise or a fall of the power level with respect to all serving, terminals inside the cell. For example, the power level determining unit 308 determines a rise of a power level with respect to serving terminals having a yield gain amount greater than sum of yield loss amounts from all the neighbor base stations, and determines a fall of the power level with respect to serving terminals having a yield gain amount not greater than the sum of the yield loss amounts from all the neighbor base stations. The power level determination for the serving terminals may be performed every frame, and may be performed periodically or non-periodically every several frames depending on an operation policy.

The scheduler 310 performs downlink scheduling on serving terminals inside a cell, and performs downlink power control on the scheduled serving terminal using the determined power level for each serving terminal.

Meanwhile, Equations $S_{NBS,var,Tput}[k][m]$ and $S_{Sum,var,Tput}[i]$ mentioned in the embodiment of the present disclosure can be expressed as in Equation (11), and can be expressed in terms of various Equations meeting a relevant purpose such as a form maximizing a throughput or a form maximizing a Proportional Fair (PF) metric depending on an operation purpose.

$$S_{NBS,var,Tput}[k][m] = \frac{\sum_i \log \frac{MPR[i]}{MPR_{NBS}[i]}}{NumMS} \quad (11)$$

$$S_{SBS,var,Tput}[i] = \log \frac{MPR_{SBS}[i]}{MPR[i]}$$

Figure 4A:
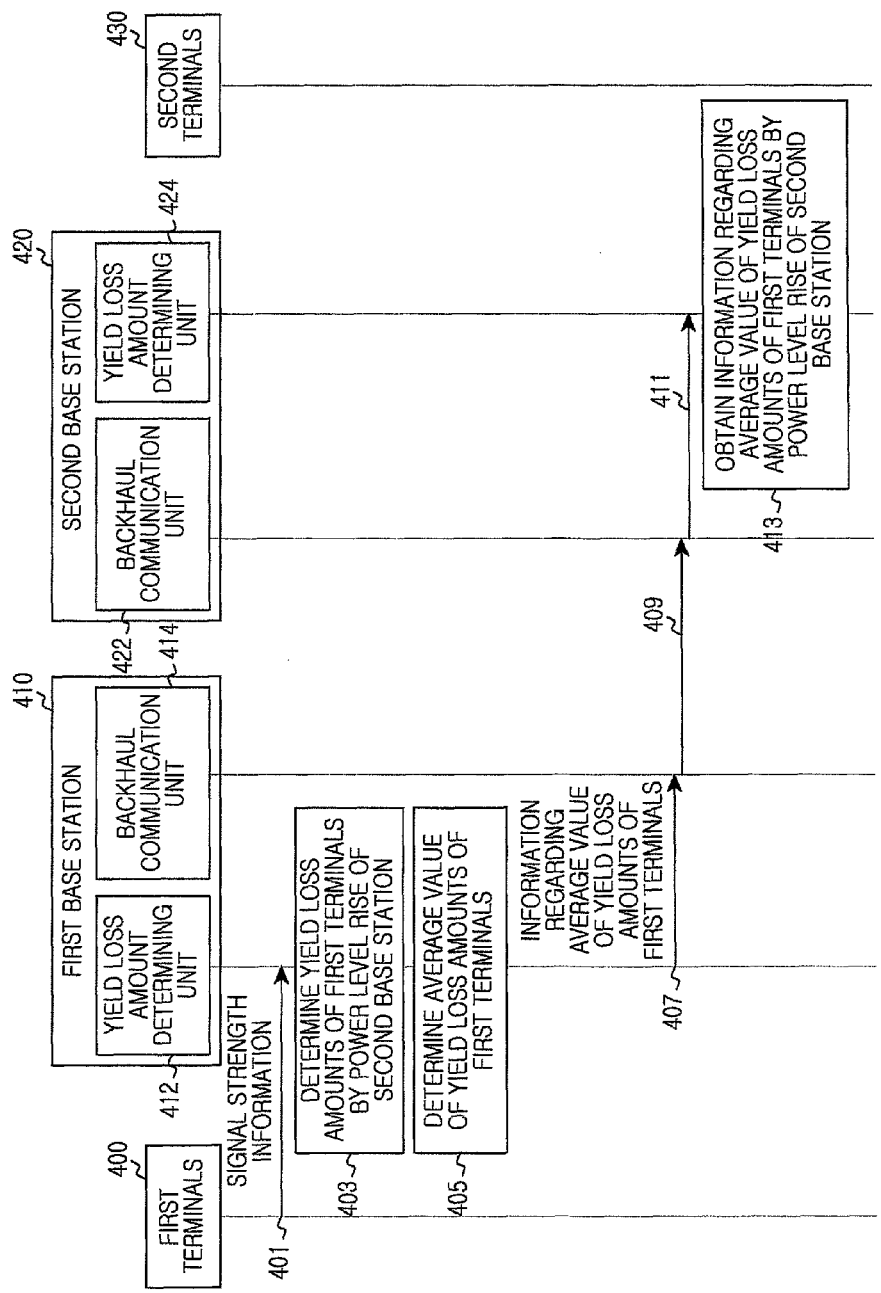
FIGS. 4A-B illustrate a method for exchanging information between base stations in a communication system according to an exemplary embodiment of the present disclosure.
Figure 4B:
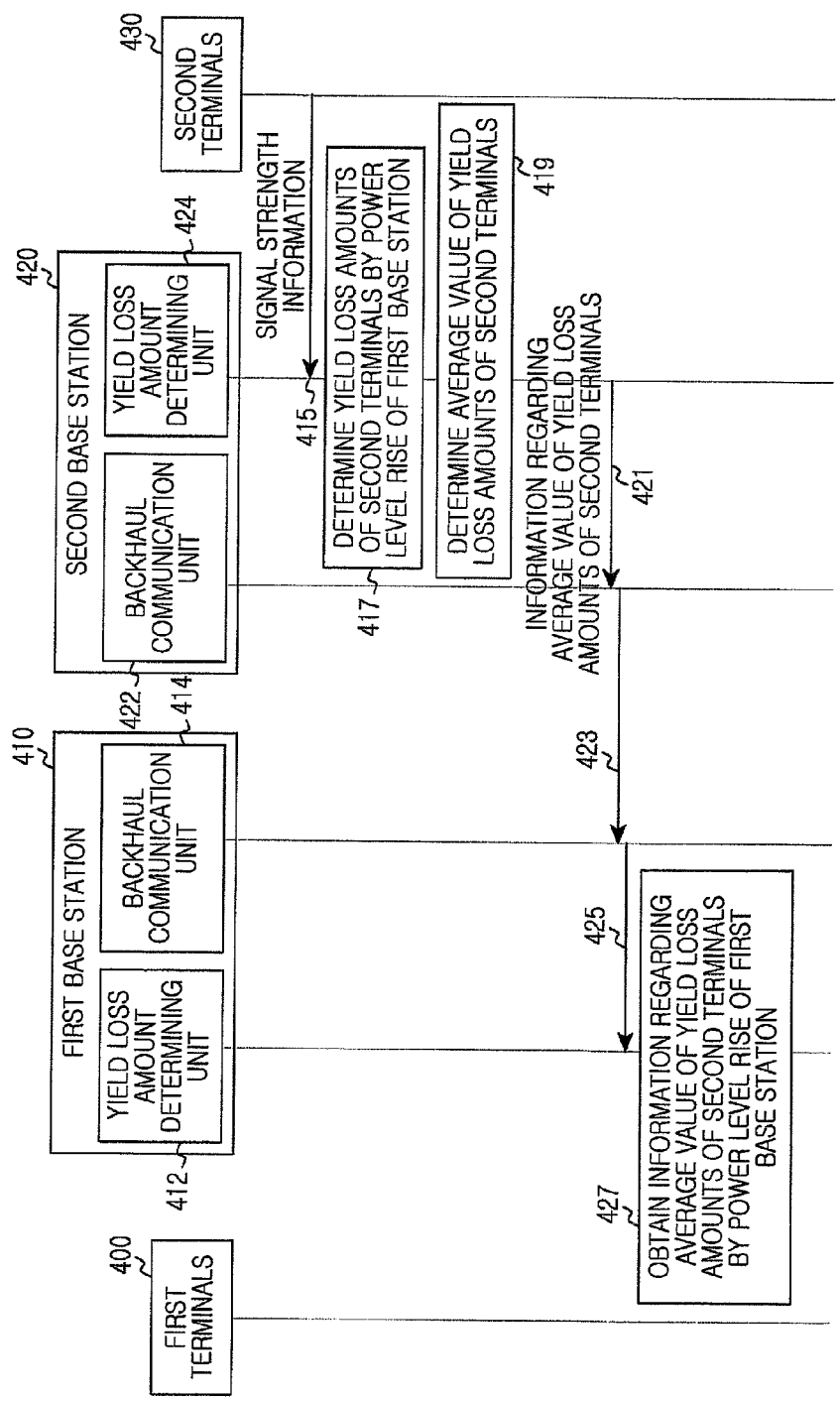

FIGS. 4A-B illustrate a method for exchanging information between base stations in a communication system according to an exemplary embodiment of the present disclosure.

Referring to FIG. 4A-B, first terminals 400 that have received a service from a first base station 410 transmits signal strength information of the first base station 410 (that is, a serving base station of the first terminals 400) and a neighbor second base station 420 (that is, a neighbor base station of the first terminals 400) to the first base station 410 (step 401). The first base station 410 may request the first terminals 400 inside a cell to measure and report signal strength of the first base station 410 and the neighbor second base station 420. Accordingly, the first terminals 400 may measure the signal strength of the first base station 410 and the neighbor second base station 420 and report the same to the first base station 410. Here, the signal strength information may be RSSI information, for example.

A yield loss amount determining unit 412 of the first base station 410 determines a yield loss amount of the first terminals 400 by a downlink power level rise (for example, 3 dB rise) of the second base station 420 based on the signal strength information of the first base station 410 and the neighbor second base station 420 received from the first base stations 400 inside the cell (step 403). Here, the yield loss amount of the first terminals 400 by the downlink power level rise (for example, 3 dB rise) of the second base station 420 may be determined using Equation (7).

The yield loss amount determining unit 412 of the first base station 410 determines an average value of yield loss amounts of the first terminals 400 determined for the second base station 420 (step 405), and outputs information regarding the determined average value of the yield loss amounts of the first terminals 400 to a backhaul communication unit 414 of the first base station 410 (step 407). Here, the average value of the yield loss amounts of the first terminals 400 determined with respect to the second base station 420 may be determined using Equation (8).

The backhaul communication unit 414 of the first base station 410 transmits information regarding an average value of the determined yield loss amounts of the first terminals 400 to the second base station 420 via backhaul communication (step 409).

A backhaul communication unit 422 of the second base station 420 outputs information regarding an average value of yield loss amounts of the first terminals 400 from the first base stations 410 to a yield loss amount determining unit 424 of the second base station 420 (step 411).

Accordingly, the yield loss amount determining unit 424 of the second base station 420 may obtain information regarding the average value of the yield loss amounts of the first terminals 400 by a downlink power level rise (for example, 3 dB rise) of the second base station 420 (step 413).

Likewise, second terminals 430 that receive a service from the second base station 420 transmits signal strength information of the second base station 420 (that is, a serving base station of the second terminals 430) and the neighbor first base station 410 (that is, the neighbor base station of the second terminals 430) to the second base station 420 (step 415). The second base station 420 may request the second terminals 430 inside a cell to measure and report the signal strength of the second base station 420 and the neighbor first base station 410. Accordingly, the second terminals 430 may measure the signal strength of the second base station 420 and the neighbor first base station 410, and report the same to the second base station 420. Here, the signal strength information may be RSSI information, for example.

The yield loss amount determining unit 424 of the second base station 420 determines yield loss amounts of the second terminals 430 by a downlink power level rise (for example, 3 dB rise) of the first base station 410 based on the signal strength information of the second base station 420 and the neighbor first base station 410 received from the second terminals 430 inside the cell (step 417). Here, the yield loss amounts of the second terminals 430 by the downlink power level rise (for example, 3 dB rise) of the first base station 410 may be determined using Equation (7).

The yield loss amount determining unit 424 of the second base station 420 determines an average value of the yield loss amounts of the second terminals 430 determined with respect to the first base station 410 (step 419), and outputs information regarding the determined average value of the yield loss amounts of the second terminals 430 determined with respect to the first base station 410 to the backhaul communication unit 422 of the second base station 420 (step 421). Here, the average value of the yield loss amounts of the second terminals 430 determined with respect to the first base station 410 may be determined using Equation (8).

The backhaul communication unit 422 of the second base station 420 transmits information regarding the determined average value of the yield loss amounts of the second terminals 430 to the first base station 410 via backhaul communication (step 423).

The backhaul communication unit 414 of the first base station 410 outputs information regarding an average value of yields loss amounts of the second terminals 430 from the second base station 420 to the yield loss amount determining unit 412 of the first base station 410 (step 425).

Accordingly, the yield loss amount determining unit 412 of the first base station 410 may obtain the information regarding the average value of yields loss amounts of the second terminals 430 by a downlink power level rise (for example, 3 dB rise) of the first base station 410 (step 427).

Figure 5A:
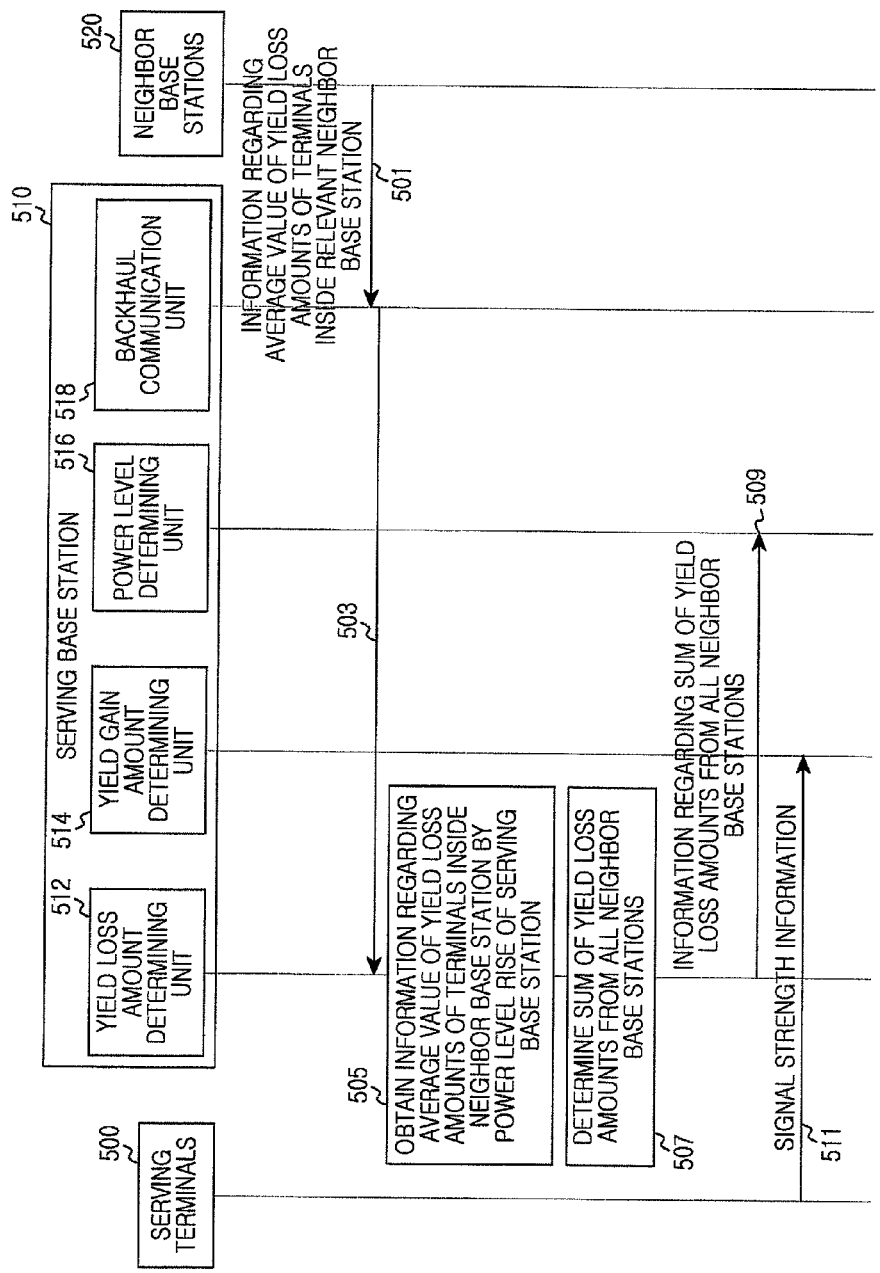
FIGS. 5A-B illustrate a method for determining a downlink transmission power level of a serving terminal via information exchange with neighbor base stations at a serving base station in a communication system according to an exemplary embodiment of the present disclosure.
Figure 5B:
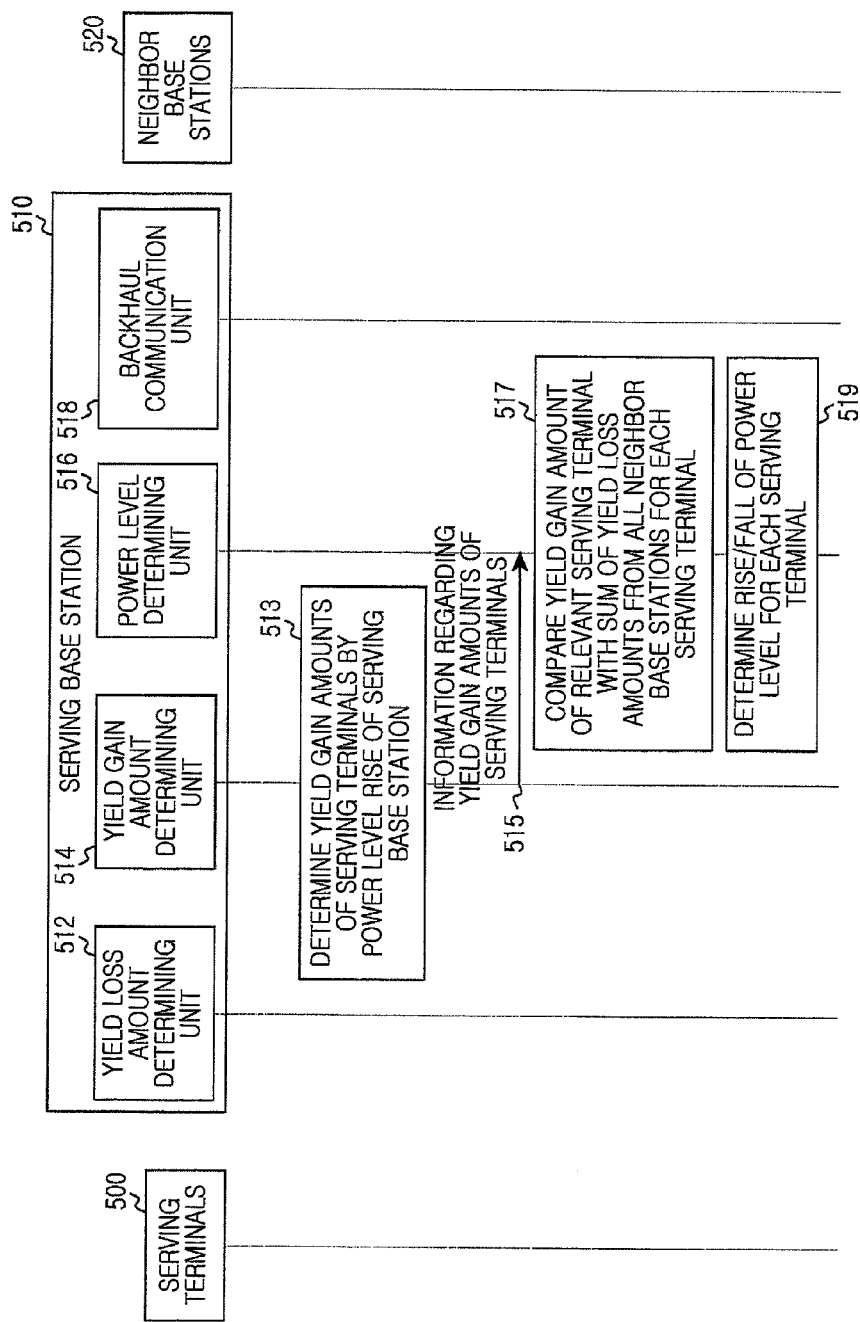

FIGS. 5A-B illustrate a method for determining a downlink transmission power level of a serving terminal via information exchange with neighbor base stations at a serving base station in a communication system according to an exemplary embodiment of the present disclosure.

Referring to FIGS. 5A-B, neighbor base stations 520 transmits information regarding an average value of yield loss amounts of terminals inside a relevant neighbor base station by a downlink power level rise (for example, 3 dB rise) of a serving base station 510 to the serving base station 510 via backhaul communication (step 501).

A backhaul communication unit 518 of the serving base station 510 outputs the information regarding the average value of the yield loss amounts of the terminals inside the relevant neighbor base station from the neighbor base stations 520 to a yield loss amount determining unit 512 of the serving base station 510 (step 503).

Accordingly, the yield loss amount determining unit 512 of the serving base station 510 may obtain the information regarding the average value of the yield loss amounts of the terminals inside the relevant neighbor base station by the downlink power level rise (for example, 3 dB rise) of the serving base station 510 (step 505).

The yield loss amount determining unit 512 of the serving base station 510 determines sum of yield amounts from all neighbor base stations 520 (step 507), and outputs information regarding the determined sum of the yield amounts from all the neighbor base stations 520 to a power level determining unit 516 of the serving base station 510 (step 509). Here, the sum of the yield amounts from all the neighbor base stations 520 may be determined using Equation (9).

Meanwhile, serving terminals 500 that receive a service from the serving base station 510 transmits signal strength information of the serving base station 510 and the neighbor base stations 520 to the serving base station 510 (step 511). The serving base station 510 may request the serving terminals 500 inside a cell to measure and report signal strength of the serving base station 510 and the neighbor base stations 520. Accordingly, the serving terminals 500 may measure signal strength of the serving base station 510 and the neighbor base stations 520 and report the same to the serving base station 510. Here, the signal strength may be RSSI information, for example.

A yield gain amount determining unit 514 of the serving base station 510 determines yield gain amounts of the serving terminals 500 by a downlink power level rise (for example, 3 dB rise) of the serving base station 510 based on the signal strength information of the serving base station 510 and the neighbor base stations 520 received from the serving terminals 500 inside the cell (step 513). Here, the yield gain amounts of the serving terminals 500 by the downlink power level rise (for example, 3 dB rise) of the serving base station 510 may be determined using Equation (10).

The yield gain amount determining unit 514 of the serving base station 510 outputs information regarding the yield gain amounts of the serving terminals 500 by the downlink power level rise (for example, 3 dB rise) of the serving base station 510 to a power level determining unit 516 of the serving base station 510 (step 515).

After that, the power level determining unit 516 of the serving base station 510 compares a yield gain amount of a relevant serving terminal with sum of yield loss amounts from all neighbor base stations 520 for each serving terminal 500 (step 517). That is, the power level determining unit 516 of the serving base station 510 compares a yield gain amount of the serving terminal by the power level rise of the serving base station 510 with sum of yield loss amounts of terminals inside all the neighbor base station 520 by the power level rise of the serving base station 510.

After that, the power level determining unit 516 of the serving base station 510 determines a rise/fall of the power level of each serving terminal 500 depending on the comparison result for each serving terminal 500 (step 519). For example, when determining that the yield gain amount of the relevant serving terminal is greater than sum of yield loss amounts from all the neighbor base stations 520, the power level determining unit 516 of the serving base station 510 determines a rise of the power level of the relevant serving terminal. When determining that the yield gain amount of the relevant serving terminal is not greater than sum of yield loss amounts from all the neighbor base stations 520, the power level determining unit 516 of the serving base station 510 determines a fall of the power level of the relevant serving terminal.

Figure 6:
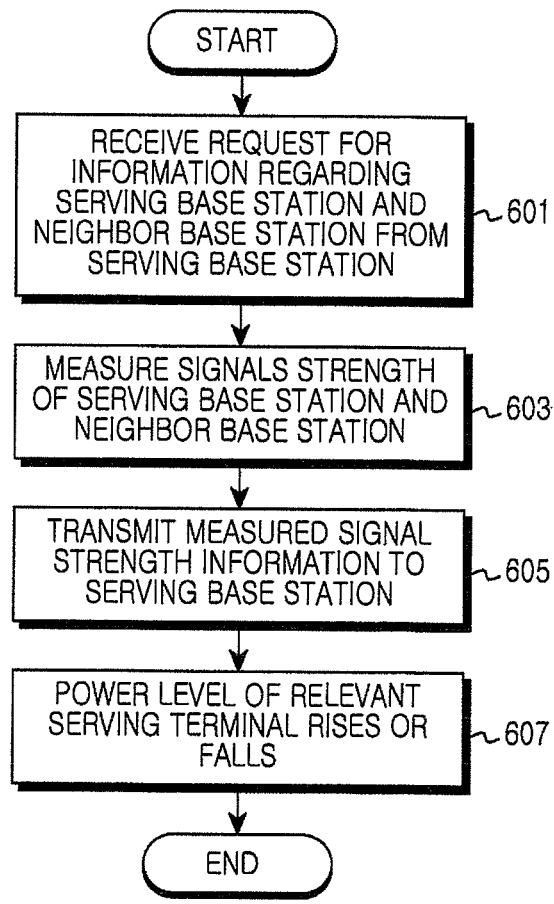
FIG. 6 illustrates a method for operating a serving terminal according to an exemplary embodiment of the present disclosure.

FIG. 6 illustrates a method for operating a serving terminal according to an exemplary embodiment of the present disclosure. As illustrated in FIG. 6, the serving terminal is requested by a serving base station to measure signal strength information of the serving base station and a neighbor base station (601). More specifically, the reason the serving base station requests the serving terminal to measure the signal strength information of the serving base station and the neighbor base station is to allow the serving base station and the neighbor base station to determine yield loss amounts of serving terminals by a downlink power level rise of the neighbor base station based on the signal strength information.

The serving terminal that has been requested to measure the signal strength of the serving base station and the neighbor base station measures the signal strength of the serving base station and the neighbor base station (603). Here, the signal strength information may include RSSI information.

The serving terminal that has measured signal strength of the serving base station and the neighbor base station transmits the measured signal strength information to the serving base station (605). More specifically, when the serving terminal measures signal strength of the serving base station and the neighbor base station and transmits the measured signal strength information to the serving base station, the serving base station determines a yield loss amount of the relevant serving terminal that has transmitted the signal strength information.

After that, the power level of the relevant serving terminal rises or falls (607). More specifically, the serving base station calculates a yield gain amount and sum of yield loss amounts.

When determining that the yield gain amount is greater than the sum of the yield loss amounts, the serving base station determines a rise of the power level of the relevant serving terminal. In contrast, when determining that the yield gain amount is smaller than the sum of the yield loss amounts, the serving base station determines a fall of the power level of the relevant serving terminal. Therefore, the power level of the serving terminal rises or falls due to determination of the serving base station.

Figure 7:
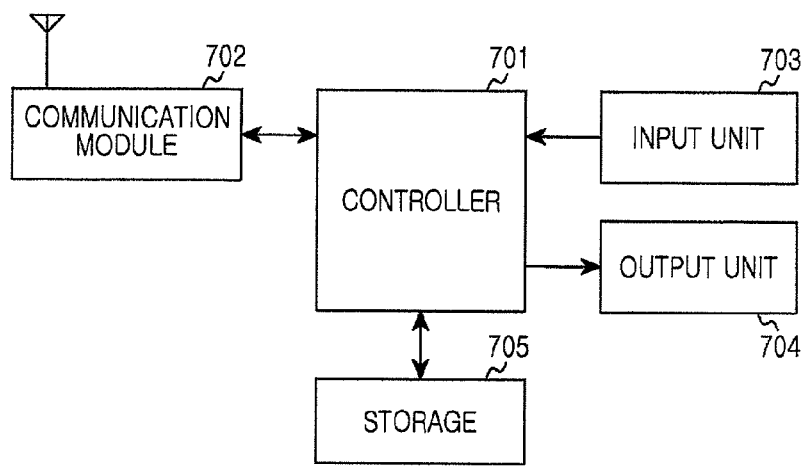
FIG. 7 illustrates a serving terminal according to an exemplary embodiment of the present disclosure.

FIG. 7 illustrates a serving terminal according to an exemplary embodiment of the present disclosure. As illustrated in FIG. 7, the serving terminal may include a controller 701, a communication module 702, an input unit 703, an output unit 704, and a storage 705.

The controller 701 controls an overall operation of the serving terminal. For example, the controller 701 is requested by a serving base station to measure signal strength of the serving base station and a neighbor base station, and measures the signal strength of the serving base station and the neighbor base station.

For voice and data communication, a communication module 702 processes a signal transmitted/received via an antenna. For example, the communication module 702 transmits the measured signal strength information to the serving base station.

The input unit 703 provides input data generated by a user's selection to the controller 701.

The output unit 704 displays state information of the serving terminal, a menu screen, and story information under control of the controller 701.

The storage 705 may include program storage for storing a program for controlling, an operation of the serving terminal and a data storage for storing data occurring during execution of a program.

In the above-described block configuration, the controller 701 may perform an overall function of the serving terminal. Separate configuration and illustration of respective elements of the serving terminal in an exemplary embodiment of the present disclosure is for separately describing each function. Therefore, in actual realization of a product, all or some of the functions of the serving terminal may be processed by the controller 701.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present disclosure should not be limited to the above-described embodiments but should be determined by not only the appended claims but also the equivalents thereof.

What is claimed is:

1. A method for operating a serving base station and controlling interference in a communication system, the method comprising:
    determining a sum of yield loss amounts of terminals inside a neighbor base station by a power level rise of the serving base station;
    determining yield gain amounts of serving terminals by the power level rise of the serving base station; and
    comparing the sum of the yield loss amounts of the terminals inside the neighbor base station by the power level rise of the serving base station with the determined yield gain amounts of the serving terminals by the power level rise of the serving base station to determine a power level for each of the serving terminals.

2. The method of claim 1 further comprising:
obtaining signal strength information of the serving base station and the neighbor base station from the serving terminals.

3. The method of claim 2, wherein the yield gain amounts of the serving terminals by the power level rise of the serving base station are determined using equations below:

$$S_{SBS,var,Tput}[i] = \frac{MPR_{SBS}[i]^b}{MPR[i]}$$

wherein $MPR[i] = f(CQI_{CELL}[i])$, $MPR_{SBS}[i] = f(CQI_{CELL,var,SBS}[i][m])$, $$CQI_{CELL}[i] = \frac{RSSI_{SBS}[i][k]}{\sum_{m \neq k} RSSI_{NBS}[i][m] + N_0}, \text{ and}$$

$$CQI_{CELL,var,SBS}[i][m] = \frac{2 * RSSI_{SBS}[i][k]}{\sum_{m \neq k} RSSI_{NBS}[i][m] + N_0}$$

where i is an index of a serving terminal, k is an index of a serving base station, m is an index of a neighbor base station, $S_{SBS,var,Tput}[i]$ is a yield gain amount of a serving terminal i by a power level rise of a serving base station, $RSSI_{SBS}$ and $RSSI_{NBS}$ are signal strength information of a serving base station, and signal strength information of a neighbor base station obtained from a serving terminal, respectively, $N_0$ is power of Gaussian noise determined depending on a system bandwidth, and b is a weight suitably controllable depending on a service purpose.

4. The method of claim 1 further comprising:
receiving information regarding yield loss amounts of terminals inside the neighbor base station by the power level rise of the serving base station from the neighbor base station.

5. The method of claim 1, wherein the determining of the power level for each serving terminal comprises:
determining a rise of a power level with respect to serving terminals having a yield gain amount greater than the determined sum of the yield loss amounts of the terminals inside the neighbor base station by the power level rise of the serving base station; and
determining a fall of a power level with respect to serving terminals having a yield gain amount not greater than the determined sum of the yield loss amounts of the terminals inside the neighbor base station by the power level rise of the serving base station.

6. The method of claim 1 further comprising:
determining yield loss amounts of the serving terminals by a power level rise of the neighbor base station; and
transmitting information regarding the determined yield loss amounts of the serving terminals by the power level rise of the neighbor base station to a relevant neighbor base station.

7. The method of claim 6 further comprising:
obtaining signal strength information of the serving base station and the neighbor base station from serving terminals.

8. The method of claim 7, wherein the yield loss amounts of the serving terminals by the power level rise of the neighbor base station are determined using equations below:

$$S_{NBS,var,Tput}[i] = \frac{MPR[i]}{MPR_{NBS}[i]^a}$$

wherein $MPR[i] = f(CQI_{CELL}[i])$, $MPR_{NBS}[i] = f(CQI_{CELL,var,NBS}[i][m])$, $$CQI_{CELL}[i] = \frac{RSSI_{SBS}[i][k]}{\sum_{m \neq k} RSSI_{NBS}[i][m] + N_0}, \text{ and}$$

$$CQI_{CELL,var,NBS}[i][m] = \frac{2 * RSSI_{SBS}[i][k]}{\sum_{m \neq k} RSSI_{NBS}[i][m] + N_0 + RSSI_{NBS}[i][m]}$$

where i is an index of a serving terminal, k is an index of a serving base station, m is an index of a neighbor base station, $S_{NBS,var,Tput}[i]$ is a yield loss amount of a serving terminal i by a power level rise of a neighbor base station, $RSSI_{SBS}$ and $RSSI_{NBS}$ are signal strength information of a serving base station, and signal strength information of a neighbor base station obtained from a serving terminal, respectively, $N_0$ is power of Gaussian noise determined depending on a system bandwidth, and a is a weight suitably controllable depending on a service purpose.

9. An apparatus of a serving base station, configured to control interference in a communication system, the apparatus comprising:
a yield gain amount determining unit configured to determine yield gain amounts of serving terminals by a power level rise of the serving base station; and
a power level determining unit configured to determine a sum of yield loss amounts of terminals inside a neighbor base station by the power level rise of the serving base station, and compare the determined sum of the yield loss amounts of the terminals inside the neighbor base station by the power level rise of the serving base station with the determined yield gain amounts of the serving terminals by the power level rise of the serving base station to determine a power level for each of the serving terminals.

10. The apparatus of claim 9 further comprising:
a receiver configured to obtain signal strength information of the serving base station and the neighbor base station from the serving terminals.

11. The apparatus of claim 10, wherein the yield gain amounts of the serving terminals by the power level rise of the serving base station are determined using equations below:

$$S_{SBS,var,Tput}[i] = \frac{MPR_{SBS}[i]^b}{MPR[i]}$$

wherein $MPR[i] = f(CQI_{CELL}[i])$, $MPR_{SBS}[i] = f(CQI_{CELL,var,SBS}[i][m])$, $$CQI_{CELL}[i] = \frac{RSSI_{SBS}[i][k]}{\sum_{m \neq k} RSSI_{NBS}[i][m] + N_0}, \text{ and}$$

$$CQI_{CELL,var,SBS}[i][m] = \frac{2 * RSSI_{SBS}[i][k]}{\sum_{m \neq k} RSSI_{NBS}[i][m] + N_0}$$

where i is an index of a serving terminal, k is an index of a serving base station, m is an index of a neighbor base station, $S_{SBS,var,Tput}[i]$ is a yield gain amount of a serving terminal i by a power level rise of a serving base station, $RSSI_{SBS}$ and $RSSI_{NBS}$ are signal strength information of a serving base station, and signal strength information of a neighbor base station obtained from a serving terminal, respectively, $N_0$ is power of Gaussian noise determined depending on a system bandwidth, and b is a weight suitably controllable depending on a service purpose.

12. The apparatus of claim 9 further comprising:
a backhaul communication unit configured to receive information regarding yield loss amounts of terminals inside the neighbor base station by the power level rise of the serving base station from the neighbor base station.

13. The apparatus of claim 9, wherein the power level determining unit is further configured to determine a rise of a power level with respect to serving terminals having a yield gain amount greater than the determined sum of the yield loss amounts of the terminals inside the neighbor base station by the power level rise of the serving base station, and determine a fall of a power level with respect to serving terminals having a yield gain amount not greater than the determined sum of the yield loss amounts of the terminals inside the neighbor base station by the power level rise of the serving base station.

14. The apparatus of claim 9, further comprising:
a yield loss determining unit configured to determine yield loss amounts of the serving terminals by a power level rise of the neighbor base station; and
a backhaul communication unit configured to transmit information regarding the determined yield loss amounts of the serving terminals by the power level rise of the neighbor base station to a relevant neighbor base station.

15. The apparatus of claim 14, further comprising:
a receiver configured to obtain signal strength information of the serving base station and the neighbor base station from serving terminals.

16. The apparatus of claim 15, wherein the yield loss amounts of the serving terminals by the power level rise of the neighbor base station are determined using equations below:

$$S_{NBS,var,Tput}[i] = \frac{MPR[i]}{MPR_{NBS}[i]^a}$$

wherein $MPR[i] = f(CQI_{CELL}[i])$, $$MPR_{NBS}[i] = f(CQI_{CELL,var,NBS}[i][m]),$$

$$CQI_{CELL}[i] = \frac{RSSI_{SBS}[i][k]}{\sum_{m \neq k} RSSI_{NBS}[i][m] + N_0}, \text{ and}$$

$$CQI_{CELL,var,NBS}[i][m] = \frac{2 * RSSI_{SBS}[i][k]}{\sum_{m \neq k} RSSI_{NBS}[i][m] + N_0 + RSSI_{NBS}[i][m]}$$

where i is an index of a serving terminal, k is an index of a serving base station, m is an index of a neighbor base station, $S_{NBS,var,Tput}[i]$ is a yield loss amount of a serving terminal i by a power level rise of a neighbor base station, $RSSI_{SBS}$ and $RSSI_{NBS}$ are signal strength information of a serving base station, and signal strength information of a neighbor base station obtained from a serving terminal, respectively, $N_0$ is power of Gaussian noise determined depending on a system bandwidth, and a is a weight suitably controllable depending on a service purpose.

* * * * *